Feb. 23, 1960 J. B. ARMITAGE ET AL 2,925,747
MACHINE TOOLS
Original Filed Aug. 25, 1948 3 Sheets-Sheet 1

INVENTOR.
Joseph B. Armitage
BY & John B. Lukey

Attorney

United States Patent Office 2,925,747
Patented Feb. 23, 1960

2,925,747
MACHINE TOOLS

Joseph B. Armitage, Wauwatosa, and John B. Lukey, West Allis, Wis., assignors to Kearney & Trecker Corporation, West Allis, Wis., a corporation of Wisconsin Original application August 25, 1948, Serial No. 46,006, now Patent No. 2,692,518, dated October 26, 1954. Divided and this application May 17, 1954, Serial No. 430,154

7 Claims. (Cl. 77—3)

This application is a divisional application of our United States Patent No. 2,692,518, which issued on October 26, 1954, entitled "Machine Tools."

This invention relates generally to machine tools and more particularly to an improved spindle drive for a precision boring machine.

A general object of the invention is to provide an improved spindle drive transmission for a machine tool.

Another object is to provide an improved arrangement for absorbing shock transmitted through a machine tool transmission.

Another object is to provide an improved arrangement for coupling a machine tool spindle to its driving mechanism.

According to this invention a precision boring machine of the horizontal type is provided with an improved spindle drive arranged to absorb shock and vibration in the transmission. The invention features a tool spindle rotatably mounted within the spindle head and encased within a spindle driving sleeve. The driving sleeve is, also, rotatably mounted within the spindle head but independently of the spindle. The driving sleeve is operatively connected to the transmission by means of a vertical shaft, which is free to move axially with the spindle head by means of a shaft sleeve having a splined connection therewith. The vertical shaft and shaft sleeve are enclosed within a telescoping guard tube to afford protection from dirt and damage. The spindle and spindle driving sleeve are operatively interconnected by a flexible coupling attached to a flywheel secured to the spindle. The flexible coupling is designed to provide any selected degree of rigidity in that, the coupling can be inflated with liquid or gas to any desired pressure. Thus, shock and vibration originating in the transmission is effectively absorbed.

The foregoing and other objects of the invention which will become more fully apparent from the following detailed description, may be achieved through the embodiment of the invention in structures such as the exemplifying apparatus depicted in and herein described in connection with the accompanying drawing, in which.

The particular machine tool herein set forth to illustrate a practical embodiment of the various features of this invention, is a precision jig boring machine of the horizontal spindle type.

Figure 1:
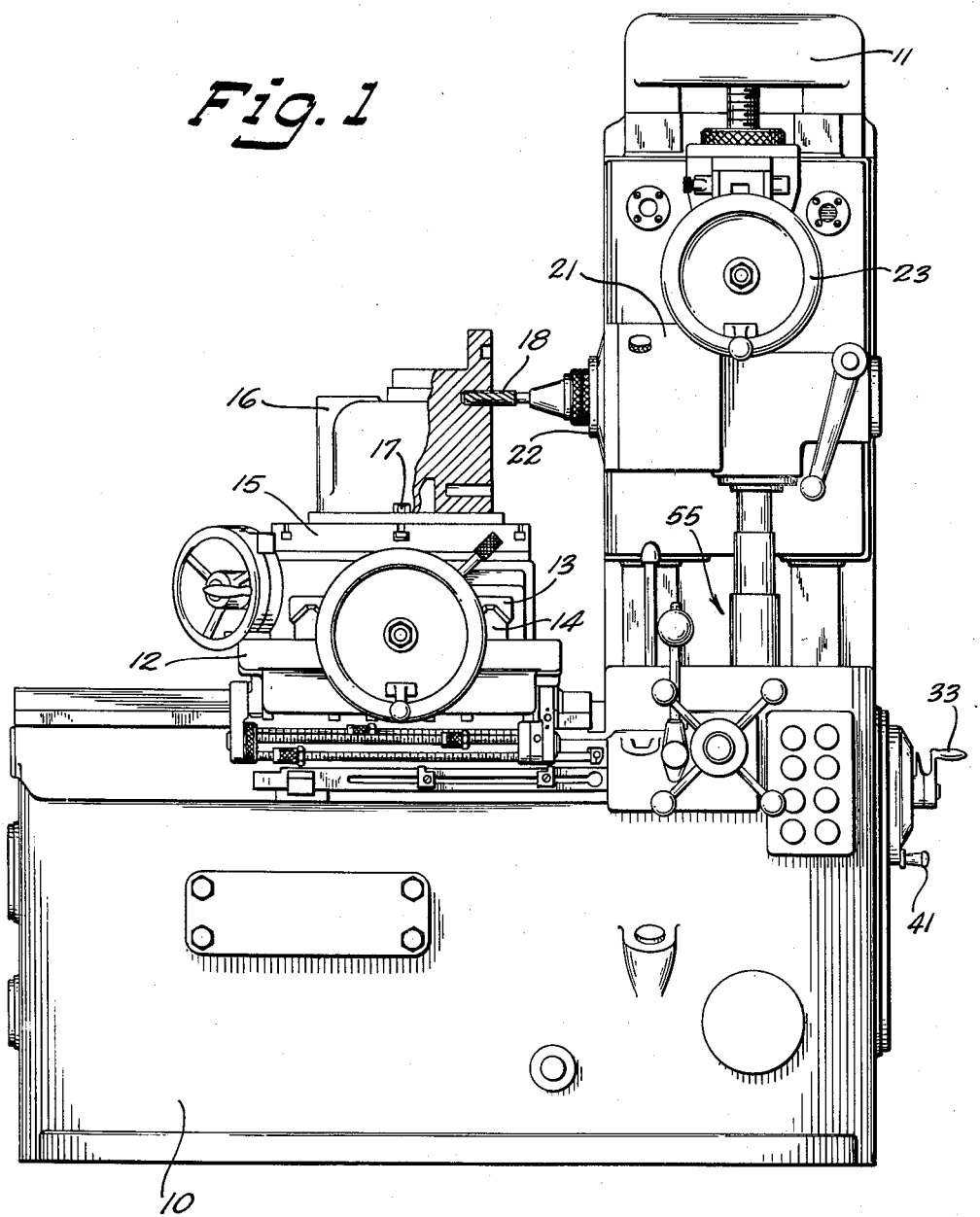
Figure 1 is a view in front elevation of a precision milling and boring machine embodying the novel features of the present invention.

Referring more specifically to the drawings and particularly to Fig. 1 thereof, the boring machine there shown comprises essentially a hollow base or bed 10 carrying an integrally formed upstanding hollow column 11, the combined structure constituting the frame of the machine and the housing for the driving mechanism. As shown, the base 10 projects outwardly from the column 11 and has slidably mounted on its upper surface, a saddle 12 for horizontal feeding movement towards and from the column 11. The saddle 12 supports a carriage 13 slidable on ways 14 for transverse horizontal adjustment, and the carriage, in turn, supports a rotary table 15 on which a workpiece 16 is mounted. Any workpiece within the capacity of the machine, such as the piece 16 illustrated in Fig. 1, may be supported on the table 15 and secured thereto by the T-bolts 17 or other appropriate clamps in position to be engaged by a boring tool 18 rotatably carried by the column 11. A spindle head 21 is slidably mounted for vertical movement along the column 11 and carries a horizontally positioned tool supporting spindle 22 in which the boring tool 18 is mounted in cooperating relationship with the workpiece 16 on the rotary table 15. Vertical movement of the spindle head 21 is obtained by manipulating a hand wheel 23 that functions to raise or lower the spindle head to any desired position.

Figure 2:
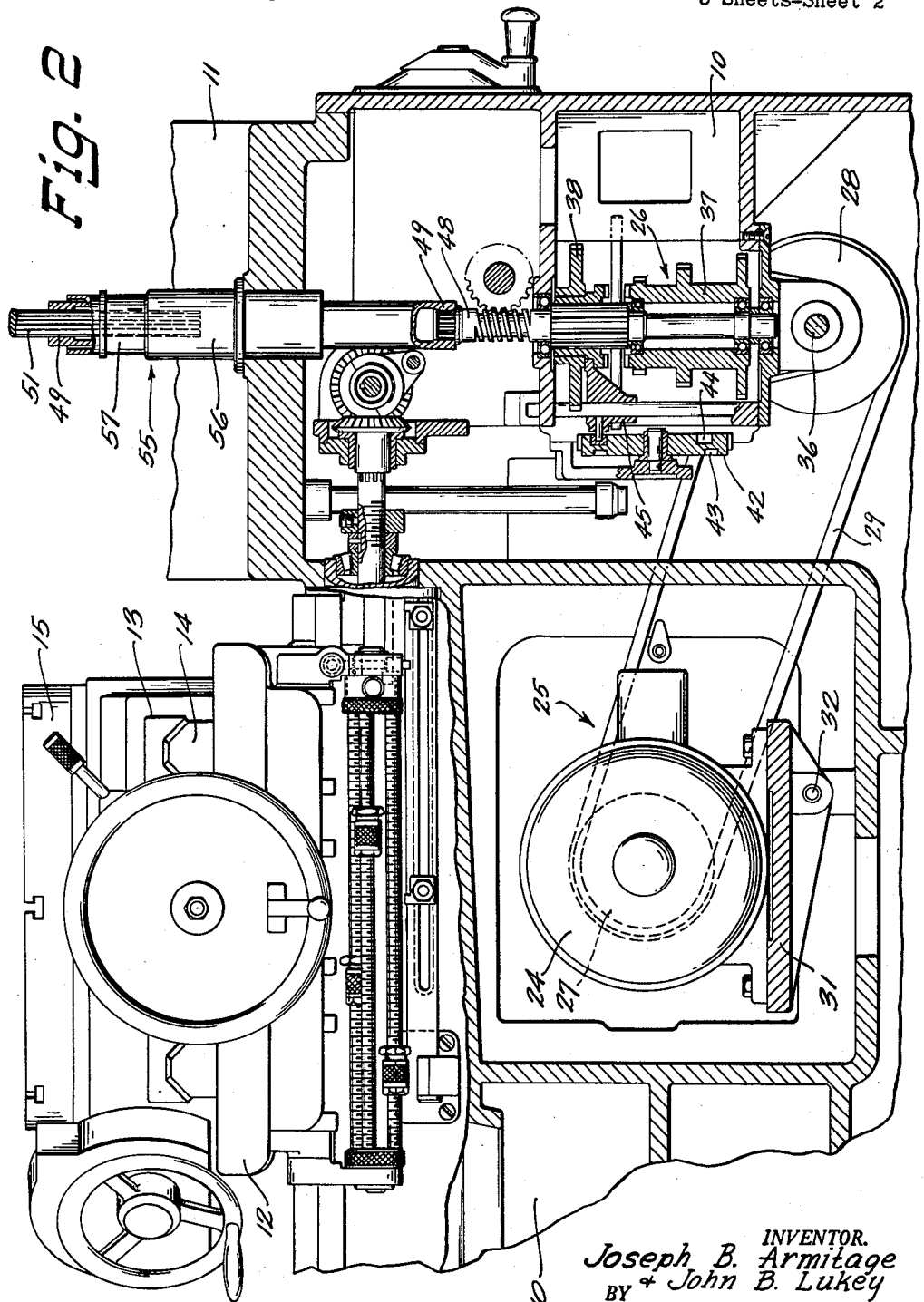
Fig. 2 is a fragmentary view in vertical section through the machine bed showing the transmission drive to the spindle as viewed from the front of the machine; and, Fig. 3 is an enlarged fragmentary detailed view of the spindle head taken in vertical section showing the tool spindle and resilient coupling.

Power for driving the spindle 22 and for effecting feeding movement of the saddle 12 is derived from an electric motor 24 mounted within the hollow base 10 of the machine, as shown in Fig. 2. From the motor 24, power is transmitted through an infinitely variable belt drive speed change mechanism 25 and a fixed step change gear mechanism 26 within the base of the machine. The infinitely variable speed range is obtained through an expansible pulley 27 mounted on the motor shaft and connected to drive a rigid pulley 28 by a belt 29. The sides of the pulley 27 are forced together by a spring (not shown), while the pulley is rendered expansibly adjustable by selectively positioning the motor 24. For this purpose the motor 24 is carried by a platform 31 which is mounted for oscillation about a pivot pin 32 supported by the structure of the bed 10. The motor 24 is actuated in its arcuated movement by manipulating a hand crank 33 shown in Fig. 1.

The rigid pulley 28 is fixed to one end of the drive shaft 36, as best shown in Fig. 2, from which the power is transmitted via appropriate gearing (not shown) to the fixed step transmission 26. The fixed step transmission, which provides six speeds, includes two fixed gear couplets, one of which is shown, and referred to by the numeral 37 and two slidable gear couplets, one of which is also shown, and referred to by the numeral 38. The slidable gear couplets are shifted by manipulating a hand crank 41, shown in Fig. 1, which is operably connected to rotate the cam plate 42, as illustrated in Fig. 2. The cam plate 42 is provided with two cam grooves 43 and 44, one on each of its faces. Each cam groove engages a shifting fork, one of which is shown, and referred to by the numeral 45, it being disposed to shift the gear couplet 38. The construction and operation including a spindle speed indicating dial for adjusting the fixed step transmission is set forth and described in detail in the United States Patent No. 2,692,518 to Joseph B. Armitage and John B. Lukey, for a machine tool, issued October 26, 1954.

Figure 3:
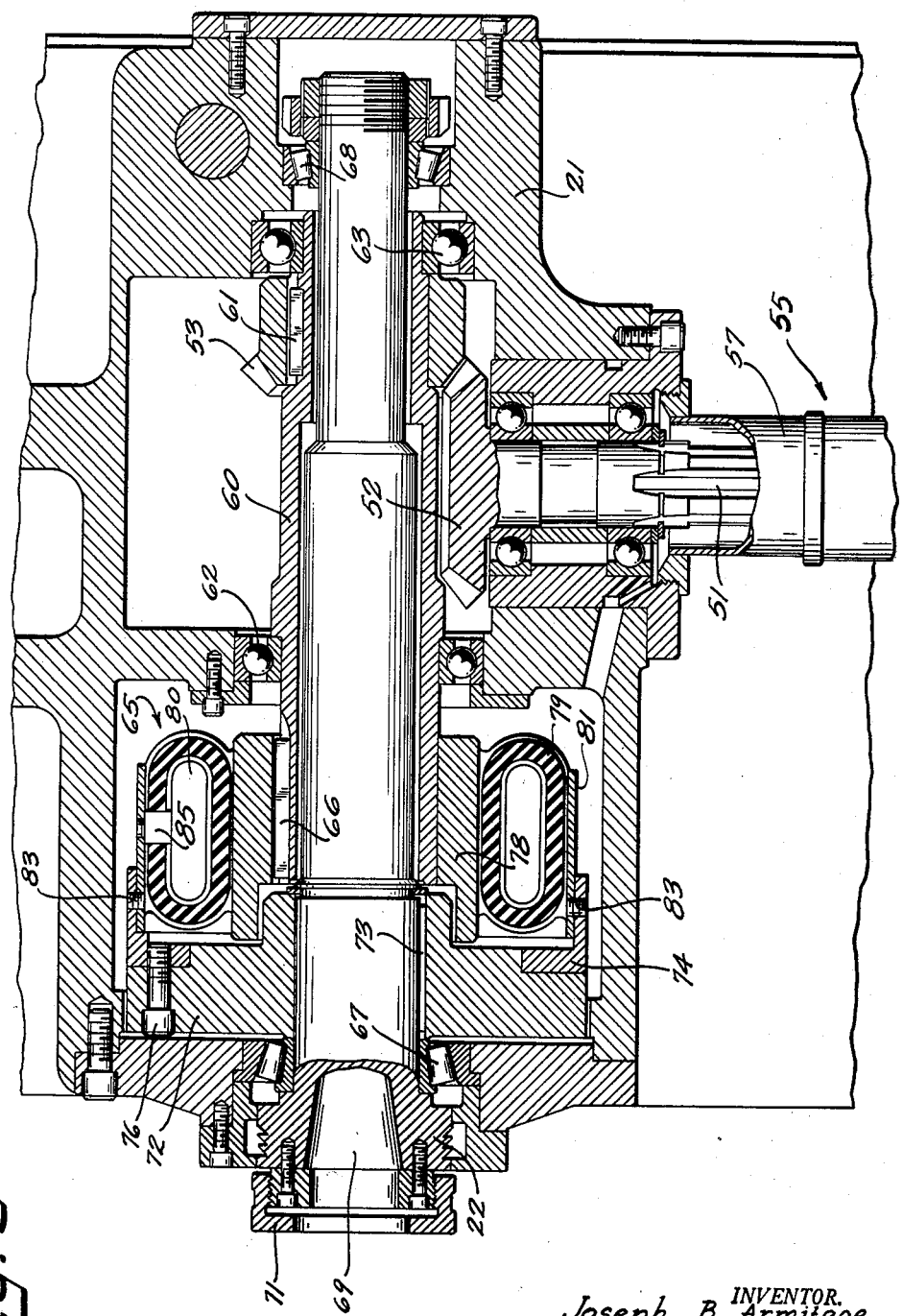

From the fixed step transmission 26 power is transmitted to the spindle head 21 by a vertical shaft 48 connected with a sleeve 49 having splined connection with the downwardly extending shaft 51 of a bevel pinion 52 rotatably journalled in the head, which engages a complementary beveled gear 53, as illustrated in Fig. 3. The splined connection between the shaft 51 of the pinion 52 and the sleeve 49 allows these two elements to remain in driving engagement while the spindle head 21 is moved up and down. The sleeve 49 and the splined shaft 51 of the pinion 52 are encased in a telescopic guard tube 55, which has its lower section 56 fixedly mounted in the top of the bed 10 through which the sleeve 49 extends. The top section 57 of the guard tube 55 is secured in the bottom of the spindle head 21 through which the splined shaft 51 extends; thus the telescopic guard tube 55 fully protects the sleeve 49 and shaft 51, which would otherwise be exposed, from dirt and damage regardless of the position of the spindle head 21 on the column 11.

The beveled gear 53 is operably connected to a spindle driving sleeve 60 by a key 61, the sleeve being rotatably supported by two bearings 62 and 63 mounted in the spindle head 21. The sleeve 60 passes through the center of a flexible coupling 65 and is operatively connected to it by a key 66. The spindle 22 is horizontally disposed within the spindle head 21 and has its rearward portion concentrically encased within the driving sleeve 60 in a manner that the sleeve is rotatably driven by the bevel gear 53 independently of the spindle 22. The spindle 22 is rotatably journalled, near its ends, in a pair of bearings 67 and 68 mounted in the spindle head 21 which rotatably support the spindle independently of the driving sleeve 60. The forward spindle supporting bearing 67 is located at the extreme forward end of the spindle so that a cutting tool 18 carried within a tool receiving socket 69 of the spindle is given the maximum support, thereby increasing the accuracy of a boring operation. The tool is retained in place by a nut 71 which is in threaded engagement with the spindle 22.

At the forward end of the spindle there is provided a flywheel 72 which is secured to the spindle by any desirable means, herein shown as being secured by a key 73. The flywheel is provided with a flanged annular member 74 secured thereto by recessed cap screws 76; the member 74 has secured to it the flexible driving coupling 65 to provide a resilient driving connection between the sleeve 60 and spindle 22.

The flexible coupling 65 is incorporated to absorb shock and vibration which might otherwise be transmitted to the tool from the power train as the machine is operating, thus permitting the tool 18 to operate smoothly without chattering. The coupling is comprised of a metal sleeve 78 and a toroidal flexible tube 79 of rubber or the like, having a hollow core 80, attached to the periphery of the sleeve 78, together with a metal band 81 secured to the periphery of the tube 79. The sleeve 78 is provided with a key slot for securing it to the spindle driving sleeve 60, as previously described, and the metal band 81 is provided with a series of screw threaded openings receiving screws 83 for fastening the coupling to the flywheel 72. The tube 79 is provided with an opening 85 for receiving a valve (not shown), through which the core 80 of the tube 79 is filled with a fluid, either liquid or gas, to any predetermined pressure depending upon the degree of rigidity which is desired in the flexible coupling 65.

From the foregoing detailed description of a practical working embodiment of the invention, it is apparent that there has been provided a useful and convenient spindle drive mechanism which will absorb shock originating in the transmission mechanism and which will smoothly drive a cutter carrying spindle.

Although but a single embodiment of the invention has been set forth in detail to constitute the full disclosure, it is to be understood that persons skilled in the art may utilize the novel principles here taught in apparatus differing in construction from the particular mechanism herein described without departing from the spirit and scope of the invention as defined in the subjoined claims.

The principles of the invention having been fully explained in connection with the foregoing description of embodying structure, we hereby claim as our invention:

1. In a machine tool, a supporting frame, a spindle rotatably journalled in said frame, a cutter secured to one end of said spindle in position to perform a cutting operation, a flywheel fixed on said spindle adjacent to its cutter receiving end, a sleeve journalled in said frame concentric with but independently of said spindle, a resilient coupling operatively connecting said sleeve to said flywheel, and a source of power connected to drive said sleeve, whereby said resilient coupling and said flywheel cooperatively contribute to provide a smooth and uniform rotation of said cutter while performing a cutting operation.

2. In a machine tool, a supporting structure, a cutter carrying spindle rotatably mounted in said supporting structure, a flywheel fixed on said spindle, a driving sleeve disposed concentric with said spindle adjacent to said flywheel and rotatably mounted in said supporting structure independently of said spindle, a flexible tube of torus shape encircling and fixed to said sleeve adjacent to said flywheel, said tube being constructed and arranged to confine a fluid at variable pressures for adjusting its resiliency to accommodate varying conditions of operations, means securing the outer periphery of said tube to said flywheel, and a source of power operatively connected to drive said sleeve, whereby said spindle may be driven through the agency of the flexible coupling afforded by said inflatable tube.

3. In a spindle drive for a machine tool, a source of power, a frame member, a spindle carried in said frame member for rotation therein, a sleeve encasing said spindle and journalled in said frame member for rotation independent of said spindle, means connecting said sleeve to said source of power including a speed changing mechanism and an extensible drive shaft, a resilient shock absorber secured to said sleeve, a flywheel secured to said spindle for rotation therewith, and means securing said resilient shock absorber to said flywheel, whereby said power source is operative to rotate the spindle free from shock impacts through said transmission mechanism and said resilient shock absorber.

4. In a machine tool, a supporting structure, a source of power, a sleeve rotatably mounted in said supporting structure and connected to be rotated by said source of power, a cutter receiving spindle disposed concentrically within said sleeve and rotatably supported by said supporting structure independently of said sleeve, a flywheel keyed to the cutter receiving end of said spindle to rotate with it, an annular flange secured to the periphery of the flywheel, an annular band attached to said flange, and a flexible tube of toroidal configuration secured at its periphery to said annular band and at its inner diameter to said sleeve, said tube being constructed and arranged to confine a fluid at variable pressures for adjusting its resiliency to accommodate varying conditions of operation, whereby the power to the spindle will be transmitted through the flexible tube and flywheel to absorb shock and vibration and thereby effect smooth rotation of the spindle.

5. In a machine tool, a frame, a source of power, a sleeve rotatably supported by said frame and connected to be rotated by said source of power, a cutter receiving spindle disposed concentrically within said sleeve and supported by said frame for rotation independently of said sleeve, a flywheel keyed to the cutter receiving end of said spindle to rotate with it, an annular flange extending axially from said flywheel, an annular band attached to said flange, a flexible tube of toroidal configuration secured at its periphery to said annular band, said tube being constructed and arranged to confine a fluid at variable pressures for adjusting its resiliency to accommodate varying conditions of operation, and a second sleeve secured to the inner diameter of said tube and keyed to said first sleeve to complete the power train from the source to the spindle, whereby the power to the spindle will be transmitted through the flexible tube and flywheel to absorb shock and vibration and thereby effect smooth rotation of the spindle.

6. In a machine tool, a frame, a source of power on said frame, work supporting means carried by said frame, a spindle rotatably supported by said frame and presenting a cutter receiving end in cooperating relationship with said work supporting means, a cutter secured to the cutter receiving end of said spindle to rotate with it and in position to perform a cutting operation upon a workpiece on said work supporting means, a flywheel fixed to said spindle to rotate with it, a transmission mechanism connected to receive power from said source, and an adjustable resilient coupling connected to transmit the power from said transmission to said spindle for rotating the spindle and said cutter to perform a cutting operation, said coupling being adjustable for regulating the degree of its resiliency to accommodate the particular operating conditions for maximum efficiency, whereby said resilient coupling and said flywheel cooperatively contribute to provide a smooth and uniform rotation of said cutter while performing a cutting operation.

7. In a machine tool, a frame, a source of power on said frame, work supporting means carried by said frame, a spindle rotatably supported by said frame and presenting a cutter receiving end in cooperating relationship with said work supporting means, a cutter secured to the cutter receiving end of said spindle in position to perform a cutting operation upon a workpiece on said work supporting means, a flywheel fixed to said spindle to rotate with it, a transmission mechanism connected to receive power from said source, and a resilient coupling connected to transmit the power from said transmission to said spindle for rotating the spindle and said cutter to perform a cutting operation, whereby said resilient coupling and said flywheel cooperatively contribute to provide a smooth and uniform rotation of said cutter while performing a cutting operation.

References Cited in the file of this patent

UNITED STATES PATENTS

| | | |
|---|---|---|
| 1,788,761 | Ernst | Jan. 13, 1931 |
| 1,802,148 | Hatfield | Apr. 21, 1931 |
| 2,141,645 | Fawick | Dec. 27, 1938 |
| 2,213,000 | Fawick | Aug. 27, 1940 |
| 2,232,637 | Schmitter | Feb. 18, 1941 |
| 2,233,822 | Schubbe | Mar. 4, 1941 |
| 2,262,512 | Musselman | Nov. 11, 1941 |
| 2,267,238 | Irwin | Dec. 23, 1941 |
| 2,307,975 | Walter | Jan. 12, 1943 |
| 2,310,878 | Stephan | Feb. 9, 1943 |
| 2,688,937 | Giger | Sept. 1, 1954 |

FOREIGN PATENTS

| | | |
|---|---|---|
| 564,825 | Great Britain | Oct. 13, 1944 |